US010095613B2

(12) United States Patent
Jo et al.

(10) Patent No.: US 10,095,613 B2
(45) Date of Patent: Oct. 9, 2018

(54) STORAGE DEVICE AND DATA PROCESSING METHOD THEREOF

(71) Applicant: Samsung Electronics Co., Ltd., Suwon-Si, Gyeonggi-Do (KR)

(72) Inventors: Myung-hyun Jo, Hwaseong-si (KR); Seongnam Kwon, Bucheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 606 days.

(21) Appl. No.: 14/310,292

(22) Filed: Jun. 20, 2014

(65) Prior Publication Data

US 2015/0074337 A1 Mar. 12, 2015

(30) Foreign Application Priority Data

Sep. 6, 2013 (KR) .................. 10-2013-0107454

(51) Int. Cl.
*G06F 12/00* (2006.01)
*G06F 12/02* (2006.01)
*G06F 12/0862* (2016.01)
*G06F 3/06* (2006.01)

(52) U.S. Cl.
CPC ........ *G06F 12/0246* (2013.01); *G06F 3/0679* (2013.01); *G06F 12/0862* (2013.01); *G06F 2212/7201* (2013.01)

(58) Field of Classification Search
CPC . G06F 3/0679; G06F 12/0862; G06F 12/0246
USPC .......................................................... 711/162
See application file for complete search history.

(56) References Cited

U.S. PATENT DOCUMENTS

| 7,328,307 | B2 | 2/2008 | Hoogterp |
| 7,774,550 | B2 | 8/2010 | Nomura et al. |
| 7,822,920 | B2 | 10/2010 | Park et al. |
| 8,151,035 | B2 | 4/2012 | Smith et al. |
| 8,312,217 | B2 | 11/2012 | Chang et al. |
| 8,341,300 | B1 * | 12/2012 | Karamcheti ........ G06F 13/1642 710/5 |
| 8,429,351 | B1 | 4/2013 | Yu et al. |

(Continued)

FOREIGN PATENT DOCUMENTS

| JP | 2006-268219 A | 10/2006 |
| JP | 2011-215805 A | 10/2011 |

*Primary Examiner* — Prasith Thammavong
(74) *Attorney, Agent, or Firm* — Harness, Dickey & Pierce, P.L.C.

(57) ABSTRACT

A data storage device which exchanges multi-stream data with a host includes a nonvolatile memory device; a buffer memory configured to temporarily store data to be stored in the nonvolatile memory device or data read from the nonvolatile memory device; and a storage controller configured to receive from the host an access command for accessing segments of the multi-stream data, the accessing including reading the segments of the multi-stream data from or writing the segments of the multi-stream data to the nonvolatile memory device, wherein the storage controller is configured to store the access-requested segments in the buffer memory, the access-requested segments being the segments of data for which access is requested in the access command, the multi-stream data including a plurality of data streams that correspond respectively to a plurality of multi-stream indexes, the first multi-stream index being one of a plurality of multi-stream indexes.

19 Claims, 17 Drawing Sheets

(56) References Cited

U.S. PATENT DOCUMENTS

| | | |
|---|---|---|
| 2007/0005904 A1 | 1/2007 | Lemoal et al. |
| 2008/0147990 A1* | 6/2008 | Pesavento ........... G06F 12/0895 711/145 |
| 2010/0161876 A1* | 6/2010 | Vyshetsky ........... G06F 12/0246 711/101 |
| 2010/0236384 A1* | 9/2010 | Shirahama ............. G10H 1/183 84/605 |
| 2011/0153910 A1* | 6/2011 | MacKenna ......... G06F 13/4234 711/103 |
| 2011/0232460 A1* | 9/2011 | Shirahama ............... G10H 7/00 84/605 |
| 2011/0276775 A1* | 11/2011 | Schuetz .............. G06F 13/1673 711/165 |
| 2012/0254524 A1 | 10/2012 | Fujimoto |
| 2016/0110105 A1* | 4/2016 | Karamcheti ............ G06F 3/061 710/302 |

* cited by examiner

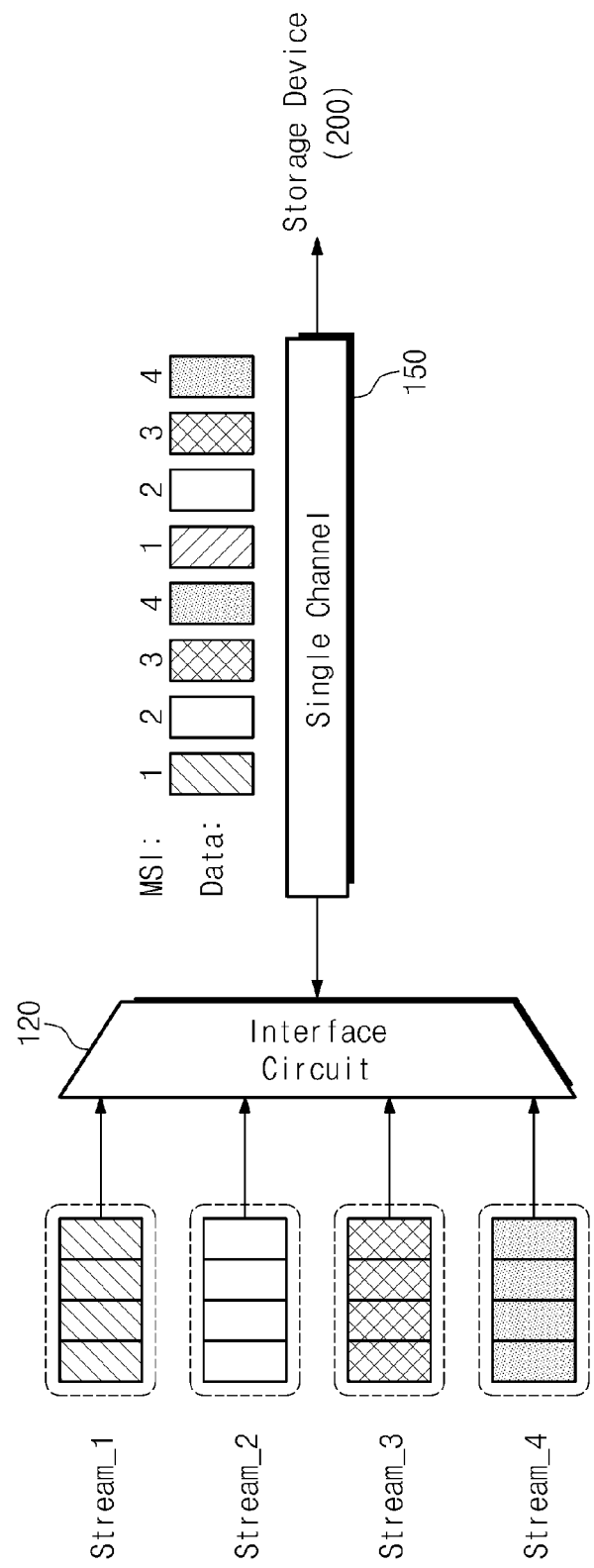

Fig. 4A

Read CMD

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Incomp. | Sequential Request | Access Latency | | | Access Frequency | | |
| 1 | Multi-Stream Index (1,2,3,4) | | | | | | | |
| 2 | Reserved | | | | | | | |
| 3 | Reserved | | | | | | | |

Fig. 4B

Write CMD

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Incomp. | Sequential Request | Access Latency | | | Access Frequency | | |
| 1 | Multi-Stream Index (1,2,3,4) | | | | | | | |
| 2 | Reserved | | | | | | | |
| 3 | Reserved | | | | | | | |

STORAGE DEVICE AND DATA PROCESSING METHOD THEREOF

CROSS-REFERENCE TO RELATED APPLICATIONS

A claim for priority under 35 U.S.C. § 119 is made to Korean Patent Application No. 10-2013-0107454 filed Sep. 6, 2013, in the Korean Intellectual Property Office, the entire contents of which are incorporated herein by reference.

BACKGROUND

At least some example embodiments of the inventive concepts described herein relate to a semiconductor memory device, and more particularly, relate to a data storage device and a data processing method thereof.

A flash memory device is widely used as a medium of storing voice and image data in information devices such as a computer, a smart phone, a PDA, a digital camera, a camcorder, a voice recorder, an MP3 player, etc. The flash memory device must be erased before data is stored therein, and is characterized in that a data erase unit is larger than a data write unit. In the event that the flash memory device is used as an auxiliary storage device, such a characteristic restricts a file system for a hard disk drive to be used without modification. In addition, such a characteristic implies that a sequential input/output processing operation of the flash memory device is more effective than a non-sequential input/output processing operation.

A typical example of a flash memory based mass storage device is a solid state drive (hereinafter, referred to as SSD). The different uses of the SSD increase together with an explosive increase in demand. For example, the different uses of the SSD may be subdivided into SSD for server, SSD for client, SSD for data center, etc. An interface of the SSD must provide optimal speed and reliability according to the use. Interfaces such as serial advanced technology attachment (SATA), peripheral component interconnect express (PCIe), serial attached small computer system interface (SAS), etc. are used as an optimal SSD interface to satisfy such requirements. In particular, non-volatile memory express (NVMe) in PCIe-based interface series has been researched and applied.

In the SSD, requests are generally divided into a sequential access request and a random access request. The SSD communicates with a host through a channel. Although a sequential input/output request is transferred from the host by a multi-thread based application program, the SSD does not recognize stream data. Since the SSD recognizes sequential data as random data, the likelihood that the sequential data is processed as random data is high. A method for processing multi-stream data efficiently may be desirable in consideration of importance of multimedia data of input/output data on the SSD.

SUMMARY

According to at least one example embodiment, a data storage device which exchanges multi-stream data with a host includes a nonvolatile memory device; a buffer memory configured to temporarily store data to be stored in the nonvolatile memory device or data read from the nonvolatile memory device; and a storage controller configured to receive from the host an access command for accessing segments of the multi-stream data, the accessing including reading the segments of the multi-stream data from or writing the segments of the multi-stream data to the non-volatile memory device, wherein the storage controller is configured to determine access-requested segments to be sequential stream data based on a first multi-stream index included in the access command and the storage controller is configured to store the access-requested segments in the buffer memory, the access-requested segments being the segments of data for which access is requested in the access command, the multi-stream data including a plurality of data streams that correspond respectively to a plurality of multi-stream indexes, the first multi-stream index being one of a plurality of multi-stream indexes.

According to at least one example embodiment, a data processing method of a solid state drive includes receiving, from a host, at least one write command identifying a plurality of data segments; decoding the write command to detect a multi-stream index allocated to each of the plurality of segment data; buffering the plurality of data segments using a plurality of write stream units allocated to a write buffer area of a buffer memory according to the multi-stream index; and sequentially programming data of a filled write stream unit into a memory block of a corresponding nonvolatile memory device, the filled write stream unit being a write stream unit from among the plurality of write stream units that has an amount of data that meets an allocated capacity of the filled write stream unit.

According to at least one example embodiment, a data processing method of a solid state drive which includes a nonvolatile memory device and a buffer memory includes receiving a first read command from a host; decoding the first read command to detect a multi-stream index allocated to first segment data identified by the first read command for a read operation; predicting second segment data to be identified by a second read command for a future read operation based on the detected multi-stream index and an address; reading the predicted second segment data from the nonvolatile memory device to prefetch the second segment data; and storing the prefetched second segment data in a prefetch resource unit of the buffer memory.

According to at least one example embodiment, a user device includes a host configured to issue access requests for a plurality of data streams of multi-stream data through a plurality of threads and configured to provide different ones of a plurality of multi-stream indexes to the plurality of data streams when the access requests are issued; and a solid state drive configured to receive an access request for accessing segments of the multi-stream data, the accessing including reading the segments of the multi-stream data from or writing the segments of the multi-stream data to the solid state drive, and determine access-requested segment data to be sequential stream data based on a multi-stream index, from among the plurality of multi-stream indexes, included in the access request, the access-requested segments being the segments of data for which access is requested in the access request.

According to at least one example embodiment, a data storage device which exchanges multi-stream data including a plurality of data streams with a host includes a nonvolatile memory device; a buffer memory; and a storage controller configured to, receive an data access command for performing a data access operation on the non-volatile memory device, the data access command identifying segments of data included in the data access operation, the data access command identifying, for each of the identified segments, a corresponding one of a plurality of multi-stream indexes, the plurality of multi-stream indexes corresponding, respectively, to the plurality of data streams, and store the identified segments in the buffer memory in accordance with the one or more multi-stream indexes.

The buffer memory may include a write buffer area and a read buffer area.

The storage controller may configured to divide the write buffer area into a plurality of sections corresponding, respectively, to the plurality of multi-stream indexes, and the storage controller may be configured such that when the data access command is a write command, the storage controller stores each of the identified segments in the section of the write buffer area that corresponds to the multi-stream index of the identified segment.

The storage controller may be configured to divide the read buffer area into a plurality of areas corresponding, respectively, to the plurality of multi-stream indexes, and the storage controller may be configured such that when the data access command is a read command, the storage controller stores each of the identified segments in the section of the read buffer area that corresponds to the multi-stream index of the identified segment.

BRIEF DESCRIPTION OF THE FIGURES

The above and other features and advantages of example embodiments of at least some example embodiments of the inventive concepts will become more apparent by describing in detail example embodiments of at least some example embodiments of the inventive concepts with reference to the attached drawings. The accompanying drawings are intended to depict example embodiments of at least some example embodiments of the inventive concepts and should not be interpreted to limit the intended scope of the claims. The accompanying drawings are not to be considered as drawn to scale unless explicitly noted.

FIG. 3 is a diagram schematically illustrating a method where write-requested multi-stream data of at least some example embodiments of the inventive concepts is transferred to a storage device;

FIGS. 4A and 4B are tables schematically illustrating a command format according to at least some example embodiments of the inventive concepts;

DETAILED DESCRIPTION

Figure 1:
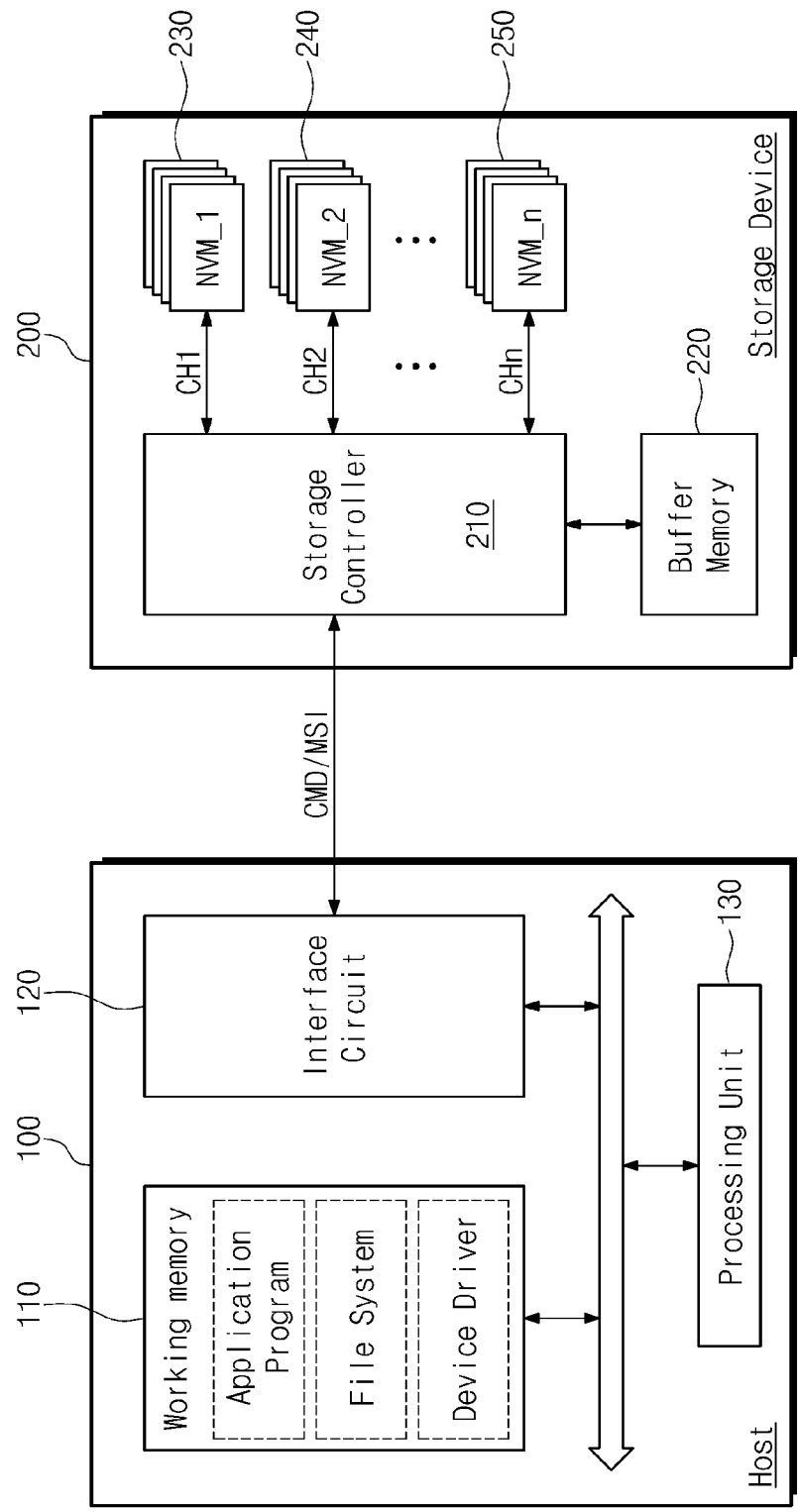
FIG. 1 is a block diagram schematically illustrating a user device according to at least some example embodiments of the inventive concepts.

Detailed example embodiments of at least some example embodiments of the inventive concepts are disclosed herein. However, specific structural and functional details disclosed herein are merely representative for purposes of describing example embodiments of at least some example embodiments of the inventive concepts. Example embodiments of at least some example embodiments of the inventive concepts may, however, be embodied in many alternate forms and should not be construed as limited to only the embodiments set forth herein.

Accordingly, while example embodiments of at least some example embodiments of the inventive concepts are capable of various modifications and alternative forms, embodiments thereof are shown by way of example in the drawings and will herein be described in detail. It should be understood, however, that there is no intent to limit example embodiments of at least some example embodiments of the inventive concepts to the particular forms disclosed, but to the contrary, example embodiments of at least some example embodiments of the inventive concepts are to cover all modifications, equivalents, and alternatives falling within the scope of example embodiments of at least some example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of at least some example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of at least some example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a solid state drive using a flash memory device is exemplarily used to describe aspects and functions of at least some example embodiments of the inventive concepts. However, other merits and performance of at least some example embodiments of the inventive concepts are understood by ones skilled in the art. Also, at least some example embodiments of the inventive concepts may be implemented by other embodiments or applied to other embodiments. In addition, it is apparent to those skilled in the art that various changes and modifications may be made without departing from the spirit and scope of example embodiments.

FIG. 1 is a block diagram schematically illustrating a user device according to at least some example embodiments of the inventive concepts. Referring to FIG. 1, a user device comprises a host 100 and a storage device 200. The host 100 is configured such that a multi-stream index (hereinafter, referred to as MSI) is included in a command set provided for accessing the storage device 200. The storage device 200 processes access requested data based on the MSI. This will be more fully described below.

The host 100 writes data in the storage device 200 and reads data from the storage device 200. The host 100 generates an access command for writing data in the storage device 200 or reading data from the storage device 200. In case of sequential data, the host 100 provides the storage device 200 with an access command CMD/MSI including the MSI. Here, the sequential data may be media data corresponding to a file. That is, one media file is write-requested by a unit of plural segments having the same MSI with respect to the storage device 200. Although segments are provided in different times, the storage device 200 processes the segments thus provided as the same stream data based on the MSI.

For this, the host 100 comprises a working memory 110, an interface circuit 120, and a processing unit 130. An application program, a file system, a device driver, etc. are loaded onto the working memory 110. Also, a variety of software by which the host 100 is driven may be loaded onto the working memory 110.

The interface circuit 120 provides physical connection between the host 100 and the storage device 200. The interface circuit 120 converts a command, an address, data, etc. corresponding to various access requests issued from the host 100 into an interface manner with the storage device 200. The interface circuit 120 may include an interface manner corresponding to at least one of USB (Universal Serial Bus), SCSI (Small Computer System Interface), PCI express, ATA, PATA (Parallel ATA), SATA (Serial ATA), SAS (Serial Attached SCSI), NVMe, etc.

The processing unit 130 executes software (e.g., an application program, an operating system, a device driver, etc.) to be performed on the host 100. The processing unit 130 executes the operating system loaded onto the working memory 110. The processing unit 130 may execute application programs to be driven based on the operating system. The processing unit 130 may be a homogeneous multi-core processor or a heterogeneous multi-core processor.

Each of application programs executed on the processing unit 130 may execute at least one thread. A thread may generate stream data such as a media file. A write request on multi-stream data is provided to the storage device 200 according to execution of plural threads. It is desirable to manage each of the stream data as sequential data in the storage device 200. Thus, the MSI is allocated to write-requested stream data by a thread unit. The allocated MSI may be added to a command set that is generated in the interface circuit 120.

The storage device 200 manages write-requested data or read-requested data by a block unit or by a certain data unit based on the MSI provided from the host 100. For example, segments of write data appointed by the same MSI are buffered by a memory block size. The storage device 200 prefetches a memory area expected with respect to a read request having the same MSI to then store it in a buffer memory 220. Afterwards, in the event that read-requested data has the same MSI and is equal to prefetched data, the prefetched data is provided to the host 100.

To control the MSI=based access, the storage device 200 comprises a storage controller 210, a buffer memory 220, and a plurality of flash memory devices 230, 240, and 250.

The storage controller 210 provides an interface between the host 100 and the storage device 200. The storage controller 210 accesses the flash memory devices 230, 240, and 250 based on MSI included in a command set provided from the host 100. The storage controller 210 forms a stream unit of the buffer memory 220, based on the MSI.

The storage controller 210 buffers data write-requested by a stream unit. Based on the MSI included in a read request, the storage controller 210 prefetches expected data from the flash memory devices 230, 240, and 250 and then stores it in a buffer area allocated by a stream unit.

With the above description, the host provides the storage device 200 with a command including the MSI. The storage device 200 allocates a data area to the buffer memory by a stream unit, based on the MSI. If a write buffer area managed by a stream unit is filled by write-requested stream data, the storage controller 210 sequentially programs corresponding stream data in assigned memory blocks of the flash memory devices 230, 240, and 250. Data provided in a multi-stream manner is efficiently read and written through the above-described stream data processing technique.

Figure 2:
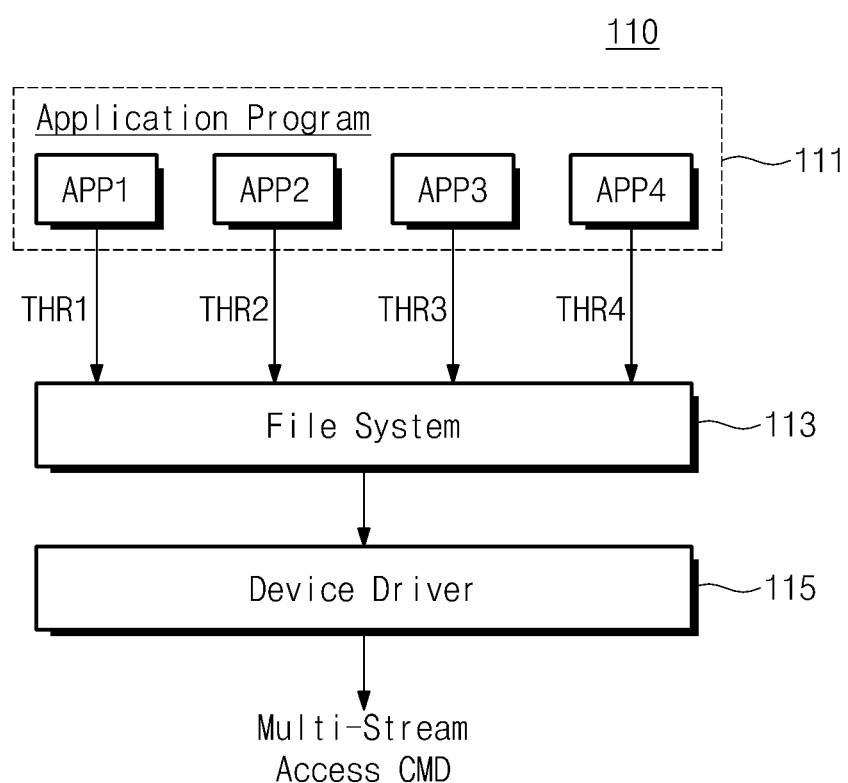
FIG. 2 is a block diagram schematically illustrating a host software layer according to at least some example embodiments of the inventive concepts.

FIG. 2 is a block diagram schematically illustrating a host software layer according to at least some example embodiments of the inventive concepts. Referring to FIG. 2, software that is loaded onto a working memory 110 and is driven by a processing unit 130 is divided into an application program 111, a file system 113, and a device driver 115. Here, the file system 113 and the device driver 115 may be included, for example, in a kernel of an operating system.

The application program 111 is an upper layer of software that is driven as a basic service or is driven by a request of a user. Application programs APP1, APP2, APP3, and APP4 are simultaneously executed to provide various services. The application programs APP1, APP2, APP3, and APP4 executed are loaded onto a working memory 110 and then are executed by a processing unit 130. For example, if playback of a moving picture file is requested by a user, an application program (e.g., a video player) for playing a moving picture is executed. The executed application program generates a read request or a write request to a storage device 200 to play a moving picture file requested by the user. In this case, there is generated a thread corresponding to a write operation performed by an application program. A thread may generate a request for writing stream data corresponding to a file at the storage device 200. Stream data corresponding to a file is divided into plural segments for a write request on the storage device 200.

When write requests on plural media files are generated, they are generated to write stream data in the storage device 200 by respective threads THR1, THR2, THR3, and THR4. In this case, each of the application programs 111 allocates a multi-stream index (MSI) on a corresponding write request. That is, a first multi-stream index MSI=1 is allocated to a file generated by the thread THR1. The file generated by the thread THR1 is transferred to the storage device 200 by a unit of plural segments. A plurality of stream data generated by respective threads THR1, THR2, THR3, and THR4 may be referred to as multi-stream data.

The file system 113 manages data using a file format corresponding to an operating system. For example, the file system 113 may allocate file names, extensions, file attributes, file sizes, cluster information, etc. on write-requested media files according to requests of the application programs 111. The file system 113 supports an overall access operation of a host 100 to process write-requested or read-requested data of the storage device 200 by a file unit. The file system 113 may mean a set of abstract data structures for hierarchically storing, searching, accessing and handling data. For example, Microsoft Windows driving a personal computer may use FAT (File allocation table) or NTFS (NT file system) as the file system 113. The file system 113 may generate, delete and manage data by a file unit.

The device driver 115 is a control module for controlling the storage device 200 at an OS level. If a memory access is requested by a user or by the application program 111, the device driver 115 is called. The device driver 115 may be implemented by a software module of a kernel for controlling the storage device 200.

According to at least some example embodiments of the inventive concepts, the application programs 111 may generate multi-stream data or an access request received by the storage device 200. However, a manner of issuing a write or read request on multi-stream data is not limited to this disclosure.

FIG. 3 is a diagram schematically illustrating a method where write-requested multi-stream data of at least some example embodiments of the inventive concepts is transferred to a storage device. Referring to FIG. 3, since a channel 150 exists between a host 100 and a storage device 200, it is difficult to transfer multi-stream data to the storage device 200 at the same time. A write request to the storage device 200 on one stream of data is performed by a unit of plural segments. In the event that a plurality of stream data is write-requested, a write command of each segment may include a multi-stream index MSI.

It is assumed that write requests on four stream data are generated by a plurality of threads executed by application programs 111 driven on a host 100. Here, it is understood that one application program two or more threads. A write request on first stream data Stream_1 is generated according to execution of a first thread THR1. An application program allocates a multi-stream index MSI=1 to segments corresponding to the first stream data Stream_1. In the event that generated data is not stream data, the multi-stream index MSI is not allocated. Likewise, a multi-stream index MSI=2 is allocated to the second stream data Stream_2 generated by the second thread THR2. A multi-stream index MSI=3 is allocated to the third stream data Stream_3 generated by the third thread THR3. A multi-stream index MSI=4 is allocated to the fourth stream data Stream_4 generated by the fourth thread THR4.

If the write requests on the first to fourth stream data Stream_1, Stream_2, Stream_3, and Stream_4 are generated, an order of the write requests is rearranged by an input/output scheduler (not shown) that is driven at a kernel or a file system level. Here, a rearrangement order is processed according to a manner where data necessitating real-time processing is first transferred. Each of the first to fourth stream data Stream_1, Stream_2, Stream_3, and Stream_4 is divided into segments for a transfer to a storage device 200 according to the rearranged order. Each of the segments may correspond to a transaction unit with the storage device 200. Each of the first to fourth stream data Stream_1, Stream_2, Stream_3, and Stream_4 is divided into segments and is transferred to an interface circuit 120. The interface circuit 120 transfers write-requested data to the storage device 200 by a unit of segments. At this time, a write command, an address LBA, a sector count nSC, etc. are transferred for a write request to the storage device 200 on a segment. According to at least some example embodiments of the inventive concepts, in particular, the host 100 inserts a multi-stream index MSI in a command corresponding to each of segment units.

As shown in FIG. 3, MSI=1 is allocated to a write command on first stream data (slashed data) and resultant data is transferred to the storage device 200. MSI=2 is allocated to a write command on second stream data (write data) and resultant data is transferred to the storage device 200. MSI=3 is allocated to a write command on third stream data (double hatched data) and resultant data is transferred to the storage device 200. MSI=4 is allocated to a write command on fourth stream data (gray data) and resultant data is transferred to the storage device 200. Segments of each multi-stream data is transferred in series to the storage device 200 through one channel 150. According to at least some example embodiments of the inventive concepts, a plurality of multi-stream data is sequentially transferred in an ascending order of multi-stream indexes MSI. However, it is understood that a plurality of multi-stream data is transferred in a particular order according to the priority.

Corresponding multi-stream index MSI is allocated to each of segments of stream data transferred to the storage device 200. The storage device 200 determines whether segment data transferred is stream data or random data, based on the multi-stream index MSI. In addition, the storage device 200 manages access-requested data by an MSI unit. Thus, it is possible to improve sequential read or write performance.

FIGS. 4A and 4B are tables schematically illustrating a command format according to at least some example embodiments of the inventive concepts. FIG. 4A shows a read command including a multi-stream index MSI, and FIG. 4B shows a write command including a multi-stream index MSI. Here, a command format may be a NVM Express (hereinafter, referred to as NVMe) being a register level interface. According to at least some example embodiments of the inventive concepts, a command is a 32-bit command and is divided by a byte unit. However, at least some example embodiments of the inventive concepts are not limited thereto.

Referring to FIG. 4A, a read command is a 32-bit command, for example. Principle information is focused on a first byte Byte_0. In the first byte Byte_0, bits Bit0 to Bit3 indicate an access frequency on a memory area in an access-requested address (LBA) range. That is, the bits Bit0 to Bit3 include information on the number of write requests or the number of read requests on the access-requested address (LBA) range.

Bits Bit4 and Bit5 of the first byte Byte_0 of the read command include access latency information. The size of access latency on access-requested data is defined by logical values of the bits Bit4 and Bit5. That is, the access latency information may be used to define whether to access under the condition that a latency is minimized or whether to allow a relatively large latency.

A bit Bit6 of the first byte Byte_0 of the read command indicates that a read-requested command is one of sequential read command sets. For example, if the bit Bit6 has a logical value of 1, it may mean that a corresponding read command is one of sequentially provided commands. On the other hand, if the bit Bit6 has a logical value of 0, it may mean that no sequential information on a corresponding read command exists.

A bit Bit7 of the first byte Byte_0 of the read command indicates whether read requested data is compressed data. For example, if the bit Bit7 has a logical value of 1, it may mean that data of a read-requested address LBA is not compressed data. On the other hand, if the bit Bit7 has a logical value of 0, it may mean that no compression information on data of the read-requested address LBA exists.

A multi-stream index MSI of at least some example embodiments of the inventive concepts is included in a second byte Byte_1. It is understood that the multi-stream index MSI is included in one of reserved bytes Byte_2 and Byte_3. The multi-stream index MSI of read-requested data is stored in the second byte Byte_1 of the read command. For example, in the event that read-requested data corresponds to a second stream of multi-stream data, the multi-stream index MSI is set to '2'. A storage device 200 may prefetch next read-requested data from flash memory devices 230 to 250 based on the multi-stream index MSI of the read command.

Referring to FIG. 4B, a write command has a bit arrangement similar to that of the read command. That is, bits Bit0 to Bit3 of a first byte Byte_0 of the write command include access frequency information corresponding to a write-requested address LBA, and bits Bit4 and Bit5 include access latency information. The access latency information on the write-requested data may be included in the bits Bit4 and Bit5 of the first byte Byte_0 of the write command. A bit Bit6 of the first byte Byte_0 of the write command includes information indicating whether a write-requested command is a part of a sequential write command. A bit Bit7 of the first byte Byte_0 of the write command includes compression information of write-requested data.

A multi-stream index MSI included in the write command of at least some example embodiments of the inventive concepts is included in a second byte Byte_1. It is understood that the multi-stream index MSI is included in one of reserved bytes Byte_2 and Byte_3. The multi-stream index MSI of write-requested data is stored in the second byte Byte_1 of the write command. For example, in the event that write-requested data corresponds to a second stream of multi-stream data, the multi-stream index MSI is set to '2'. A storage device 200 temporarily stores write-requested segment data in a second write stream unit W_Srteam_Unit_2 included in a buffer memory 220 (refer to FIG. 2), based on the multi-stream index MSI of the write command. If the second write stream unit W_Srteam_Unit_2 is filled by data of a memory block unit, the storage device 200 programs it in a memory block of a flash memory device.

Figure 5:
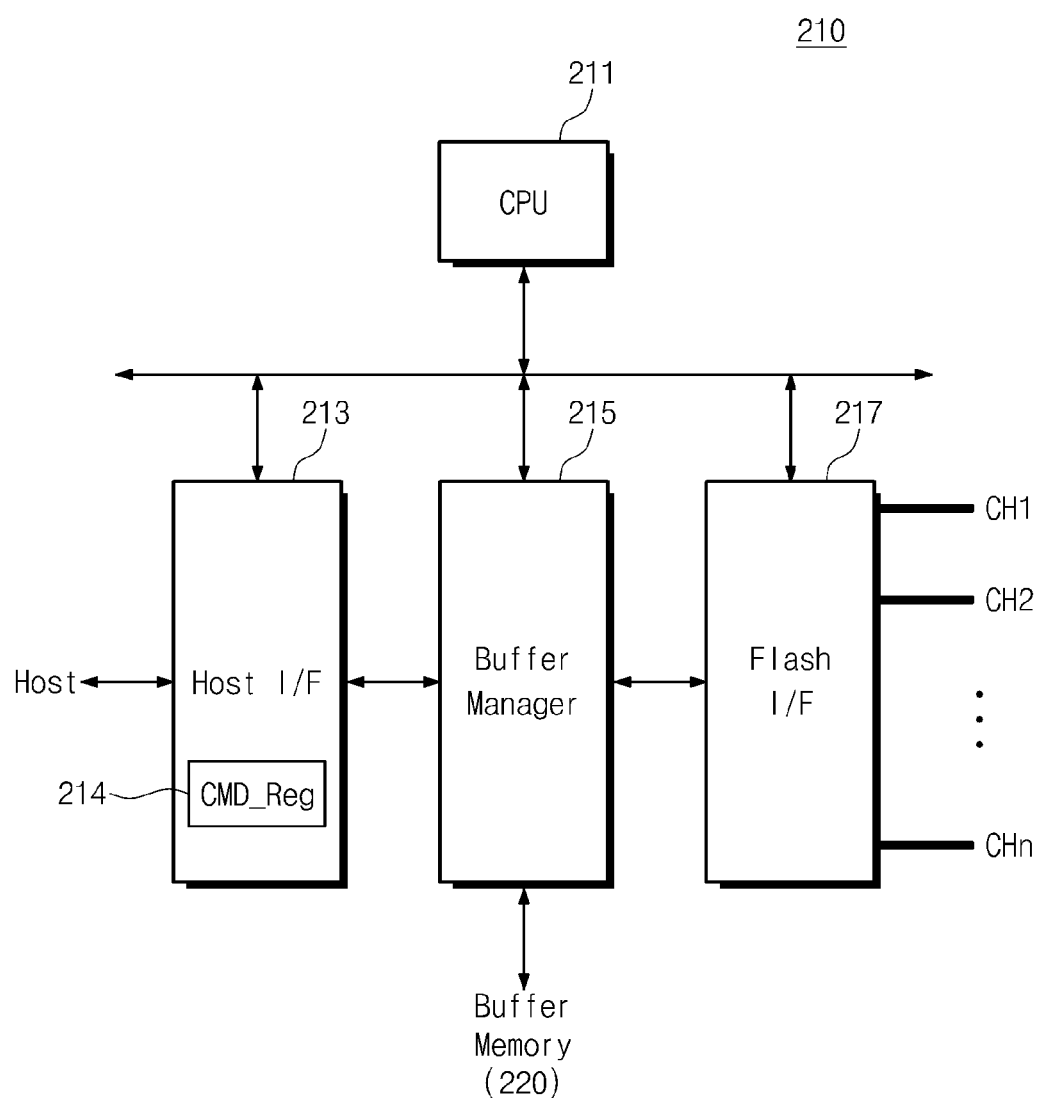
FIG. 5 is a block diagram schematically illustrating a storage controller 210 shown in FIG. 1, according to at least some example embodiments of the inventive concepts.

FIG. 5 is a block diagram schematically illustrating a storage controller 210 shown in FIG. 1, according to at least some example embodiments of the inventive concepts. Referring to FIG. 5, a storage controller 210 of at least some example embodiments of the inventive concepts comprises a central processing unit (CPU) 211, a host interface 213, a buffer manager 215, and a flash interface 217.

The CPU 211 transfers various control information for a read/write operation to a host 100 and registers of the flash interface 217. For example, if a command is received from the host 100, it is stored in a command register 214 of the host interface 213. The host interface 213 informs the CPU 211 that a read/write command is received, according to the command stored in the command register 214. This operation is performed between the CPU 211 and the flash interface 217. The CPU 211 controls components according to firmware for driving the storage device 200.

The host interface 213 provides physical connection between the host 100 and the storage device 200. That is, the host interface 213 provides an interface with the storage device 200 according to a bus format of the host 100. For example, the bus format of the host 100 may be at least one of USB (Universal Serial Bus), SCSI (Small Computer System Interface), PCI express, ATA, PATA (Parallel ATA), SATA (Serial ATA), SAS (Serial Attached SCSI), NVMe, etc.

A command transferred from the host 100 is stored in the command register 214. Various commands including the above-described write and read commands are provided to the command register 214 through a write operation by the host 100. According to at least some example embodiments of the inventive concepts, a read or write command stored in the command register 214 includes a multi-stream index MSI. The CPU 211 controls the buffer manager 215 or the flash interface 217 based on a value of the multi-stream index MSI stored in the command register 214.

The buffer manager 215 controls read and write operations of a buffer memory 220 (refer to FIG. 1). For example, the buffer manager 215 temporarily stores write data or read data in the buffer memory 220. The buffer manager 215 manages a memory area of the buffer memory 220 by a stream unit according to a control of the CPU 211. For example, if the storage device 200 is set to support four streams maximally, the buffer manager 215 manages a write buffer area using four write stream units, and manages a read buffer area using four prefetch resource units. The write stream units and the prefetch resource units will be more fully described with reference to FIG. 6.

The flash interface 217 exchanges data with flash memory devices 230 to 250. The flash interface 217 writes data transferred from the buffer memory 220 in the flash memory devices 230 to 250 through memory channels CH1 to CHn. The flash interface 217 collects read data provided from the flash memory devices 230 to 250 through the memory channels CH1 to CHn and stores the collected data in the buffer memory 220.

According to the storage controller 210 described above, access-requested data is managed according to a multi-stream index MSI stored in the command register 214. That is, a write buffer area and a read buffer area allocated to the buffer memory 220 are managed by a multi-stream unit according to setting of the host 100.

Figure 6:
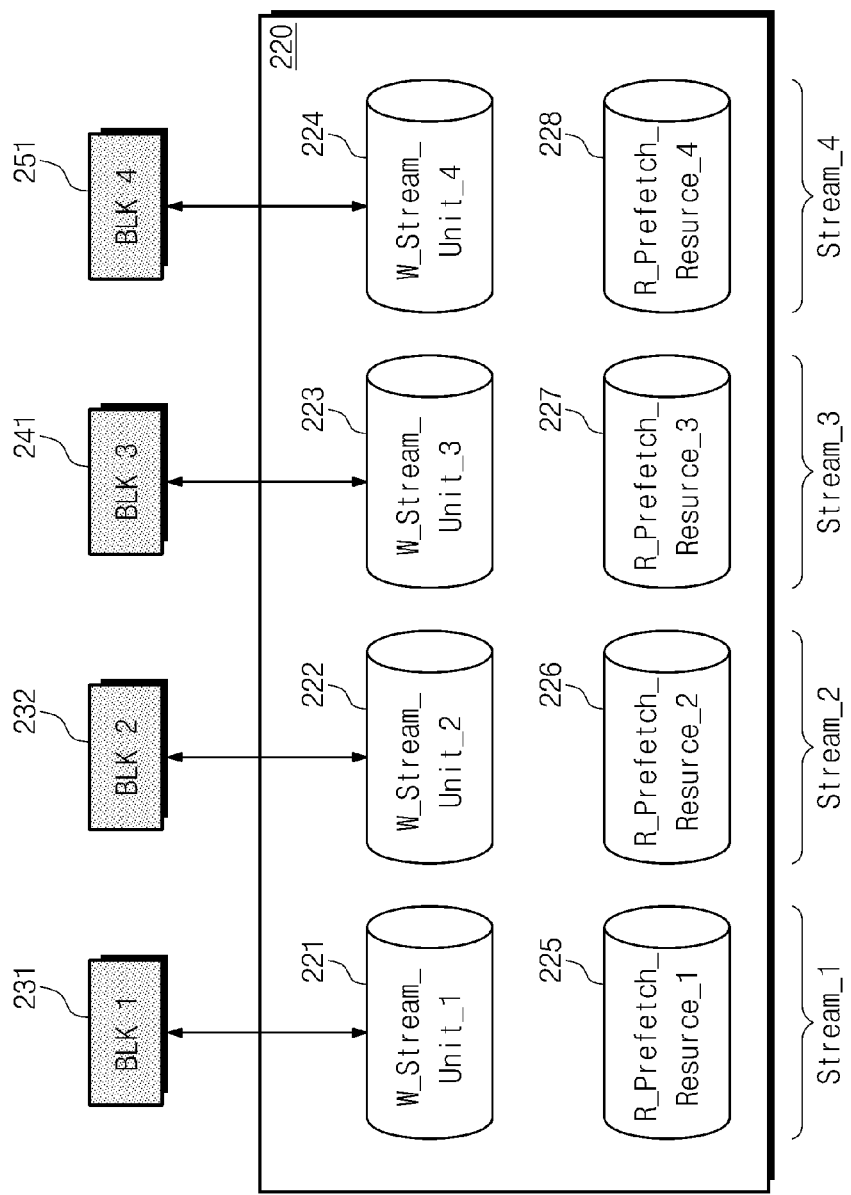
FIG. 6 is a diagram schematically illustrating a buffer memory managing method according to at least some example embodiments of the inventive concepts.

FIG. 6 is a diagram schematically illustrating a buffer memory managing method according to at least some example embodiments of the inventive concepts. Referring to FIG. 6, a write buffer area and a read buffer area of a buffer memory 220 are managed by a stream unit. For example, if a storage device 200 is set to support four streams, the write buffer area and the read buffer area of a buffer memory 220 are divided into four units and managed.

The write buffer area is managed using four write stream units 221, 222, 223, and 224. Here, a memory size of each of the write stream units 221, 222, 223, and 224 is allocated to be the same as that of a physical block of a flash memory device. However, it is understood that, according to at least some example embodiments of the inventive concepts, a memory size of each of the write stream units 221, 222, 223, and 224 may be allocated to be smaller or larger than that of a physical block of a flash memory device.

The first write stream unit 221 buffers data corresponding to a multi-stream index MSI=1 from a host 100. A write command of each segment data of a first stream Stream_1 write-requested from the host 100 includes the multi-stream index MSI=1. A storage controller 210 sequentially stores segment data corresponding to the multi-stream index MSI=1 in the first write stream unit 221. If the first write stream unit 221 is full, the storage controller 210 sequentially programs data stored in the first write stream unit 221 in a reserved memory block 231. That is, if the first write stream unit 221 is full, buffered data is flushed into a memory block of a flash memory device. After buffered data is flushed, the first write stream unit 221 is reset. The first write stream unit 221 additionally buffers data corresponding to the multi-stream index MSI=1.

Second to fourth stream units 222 to 224 are managed in the same manner as that of the first write stream unit 221. It is possible to sequentially program stream data buffered by appointed memory blocks 232 to 234 of respective flash memory devices and to allocate a new memory block.

The read buffer area is managed using four prefetch source units 225, 226, 227, and 228. Here, a memory size of each of the prefetch source units 225, 226, 227, and 228 is not limited to a particular size. For example, management is performed by a unit of sectors or by a memory block unit. In the prefetch source units 225, 226, 227, and 228, data of a corresponding logical address region is predicted and prefetched. In the event that a logical address of a next read command is equal to a predicted logical address, prefetched data is transferred to a host 100. On the other hand, if a logical address of prefetched data is different from a logical address of a next read command, prefetched data is discarded.

According to at least some example embodiments of the inventive concepts, the storage device 200 is set to support four streams. However, the write and read buffer areas of the buffer memory 220 may be managed by a multi-stream unit according to appointment of the host 100.

Figure 7:
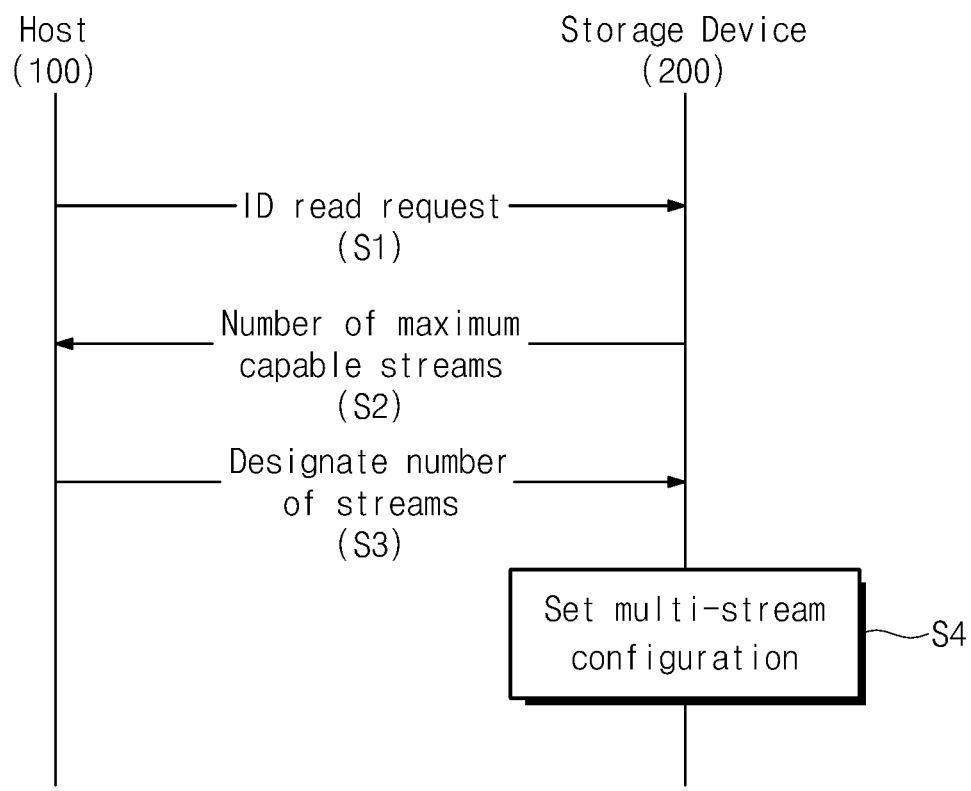
FIG. 7 is a diagram schematically illustrating a multi-stream setting method of a storage device according to at least some example embodiments of the inventive concepts.

FIG. 7 is a diagram schematically illustrating a multi-stream setting method of a storage device according to at least some example embodiments of the inventive concepts. Referring to FIG. 7, a host 100 sets a multi-stream processing condition of a storage device 200 before an access operation is performed.

In step S1, the host 100 sends an ID read request to the storage device 200. ID information of the storage device 200 may include, for example, information associated with the maximum number of streams information capable of being processed with respect to an access request of the host 100. In addition, the ID information of the storage device 200 may include data for supporting Vendor Specific Feature, a channel bandwidth, DC level information and the like.

In step S2, the storage device 200 sends the ID information to the host 100 in response to the ID read request of the host 100. The storage device 200 according to at least some example embodiments of the inventive concepts provides information on the maximum number of streams to be processed to the host 100.

In step S3, the host 100 decides the number of streams to be managed on a read or write buffer of the storage device 200 in response to a transfer of the ID information of the storage device 200. The number of streams for multi-stream processing may be decided according to a characteristic of the storage device 200. The host 100 decides the number of streams based on performance, characteristic, and resources of the storage device 200.

In step S4, the storage device 200 divides a write buffer area or a read buffer area of the buffer memory 220 by a unit corresponding to the number of streams thus decided. That is, the storage device 200 divides the write buffer area of the buffer memory 220 into a plurality of write stream units. Memory blocks of flash memory devices 230 to 250 are allocated to the write stream units, respectively. Also, the storage device 200 divides the read buffer area of the buffer memory 220 into a plurality of prefetch resource units. The buffer memory 220 may be set according to a manner described with reference to FIG. 6.

The multi-stream of the storage device 200 is set during a booting operation of the host 100 or the storage device 200 or during a reset operation.

Figure 8:
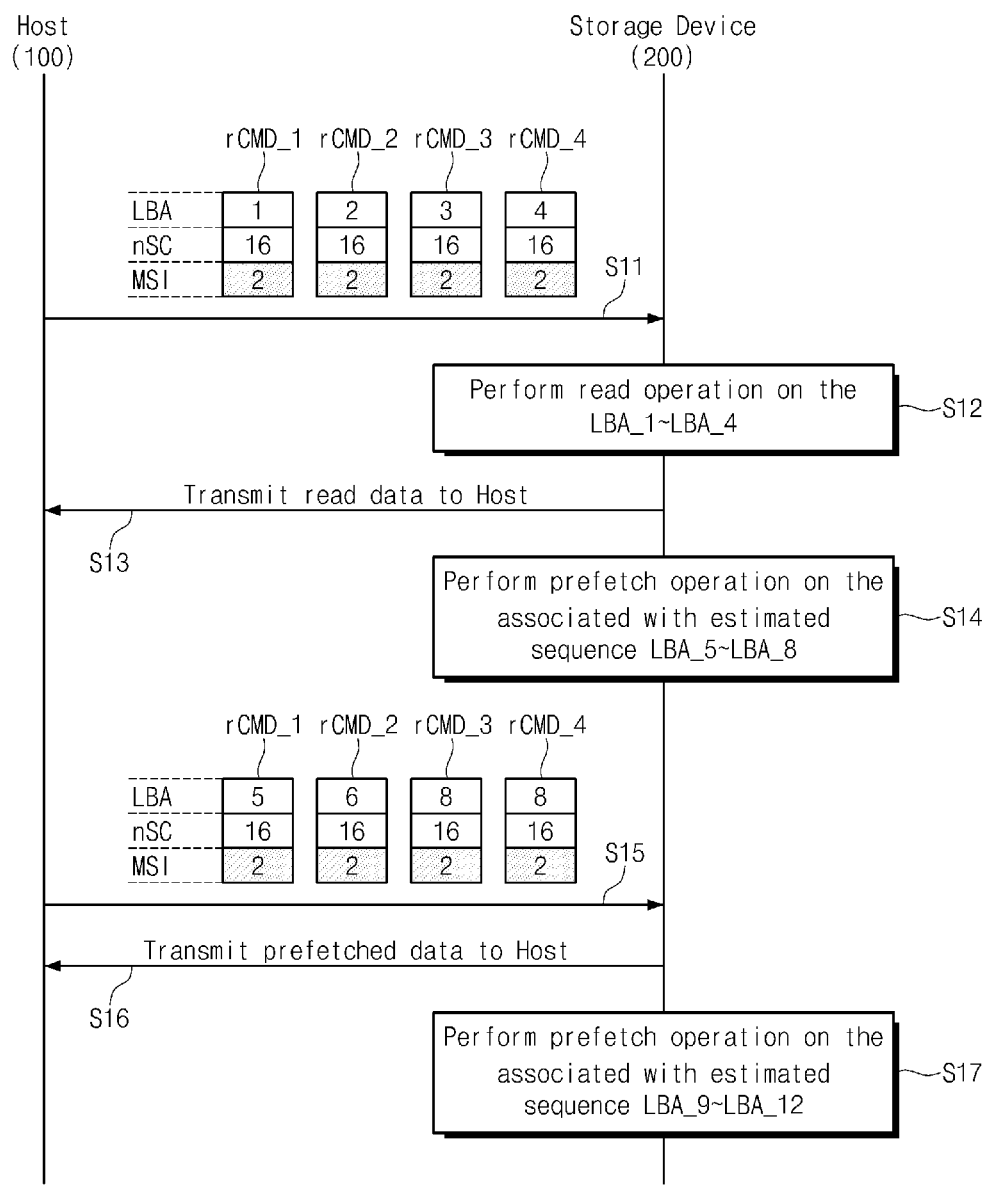
FIG. 8 is a diagram schematically illustrating a multi-stream write operation according to at least some example embodiments of the inventive concepts.

FIG. 8 is a diagram schematically illustrating a multi-stream write operation according to at least some example embodiments of the inventive concepts. Referring to FIG. 8, when a write command on stream data is transferred, a host 100 inserts a multi-stream index MSI in the write command. Here, it is assumed that multi-stream configuration of a storage device 200 is complemented through a previous configuration procedure.

In step S11, the host 100 sends a read command rCMD to the storage device 200. Here, the read command is transferred by a unit of plural transactions. A read command rCMD corresponding to each transaction unit includes a logical address LBA, a sector count nSC, and a multi-stream index MSI. Values of sector counts nSC included in read commands rCMD_1, rCMD_2, rCMD_3, and rCMD_4 are exemplary. It is understood that the storage device 200 performs a prefetch operation in response to at least one read command rCMD.

In step S12, the storage device 200 reads memory areas of flash memory devices 230 to 250 corresponding to the logical addresses LBA_1 to LBA_4, respectively. The read data is temporarily stored in a read buffer area of a buffer memory 220.

In step S13, the storage device 200 sends the read data corresponding to the logical addresses LBA_1 to LBA_4 to the host 100. After a data transfer is ended, data temporarily stored in the read buffer area is invalidated.

In step S14, the storage device 200 performs a prefetch operation based on the multi-stream index MSI. The storage device 200 recognizes previously transferred read commands rCMD_1, rCMD_2, rCMD_3, and rCMD_4 as read requests on multi-stream data. The storage device 200 predicts that data to be read-requested by the host 100 has logical addresses LBA_5 LBA_8. The storage device 200 reads stream data corresponding to a predicted multi-stream index MSI=2 from the flash memory devices 230 to 250. The read stream data may be stored in a prefetch resource unit 226 (refer to FIG. 6) prepared for second stream data of a read buffer area of the buffer memory 220.

In step S115, the host 100 sends a next read command to the storage device 200. A read command rCMD corresponding to each transaction unit includes a logical address LBA, a sector count nSC, and a multi-stream index MSI. The storage device 200 detects a logical address and a multi-stream index MSI of each of next read commands rCMD_5, rCMD_6, rCMD_7, and rCMD_8 and determines whether the detected logical address and multi-stream index MSI are equal to those of prefetched data.

In step S16, the storage device 200 sends the prefetched stream data in a prefetch resource unit 226 to the host 100. The reason is that a logical address and a multi-stream index MSI of each of next read commands rCMD_5, rCMD_6, rCMD_7, and rCMD_8 are equal to those of data prefetched by prediction. If different, the storage device 200 accesses the flash memory devices 230 to 250.

In step S17, the storage device 200 performs a prefetch operation. The storage device 200 predicts that data to be read-requested by the host is associated with logical addresses LBA_9 to LBA_12, based on previously transferred read command rCMD_5, rCMD_6, rCMD_7, and rCMD_8. The storage device 200 reads multi-stream data corresponding to a predicted multi-stream index MSI=2 from the flash memory devices 230 to 250. The read multi-stream data is stored in a prefetch resource unit 226 prepared for second stream data of the read buffer area of the buffer memory 220.

Thus, with the prefetch operation performed based on a multi-stream index MSI according to at least some example embodiments of the inventive concepts, it is possible to minimize a response time of the storage device 200 through the prefetch operation. Thus, a read speed on stream data may be remarkably improved in a storage device 200 where stream data are frequently accessed, by utilizing the prefetch manner of at least some example embodiments of the inventive concepts.

Figure 9:
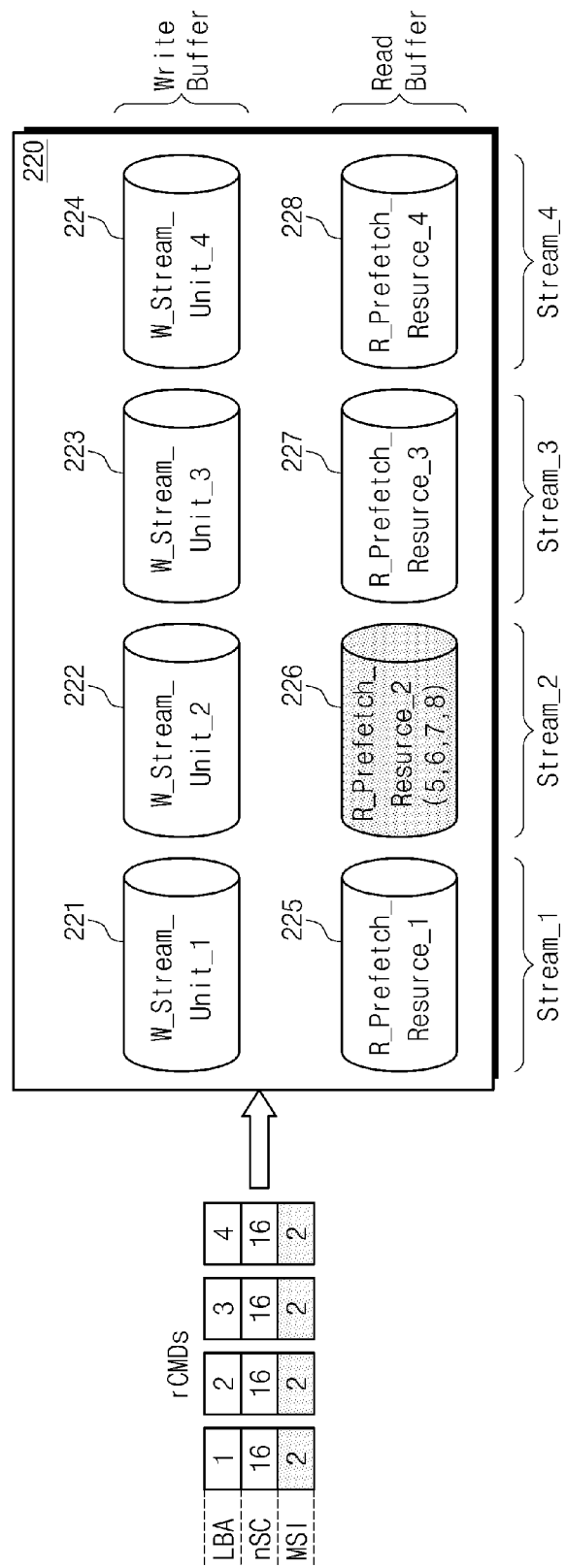
FIG. 9 is a diagram schematically illustrating a prefetch method according to at least some example embodiments of the inventive concepts.

FIG. 9 is a diagram schematically illustrating a prefetch method according to at least some example embodiments of the inventive concepts. Referring to FIG. 9, predicted stream data is prefetched in a read buffer area of a buffer memory 220.

If read commands rCMDs set to a multi-stream index MSI=2 are received, a storage controller 210 performs prediction for a prefetch operation. that is, the storage controller 210 predicts that read commands on second stream data corresponding to logical addresses LBA_5 to LBA_8 following currently read-requested logical addresses LBA_1 to LBA_4 are received. That is, during a write operation, sequential data appointed to the multi-stream index MSI=2 may be searched. The storage controller 210 prefetches the searched data in a prefetch resource unit 226 allocated to the multi-stream index MSI=2. The prefetch operation on the predicted data may be performed after read-requested data of logical addresses LBA_1 to LBA_4 are read and the read data is transferred to the host 100.

Figure 10:
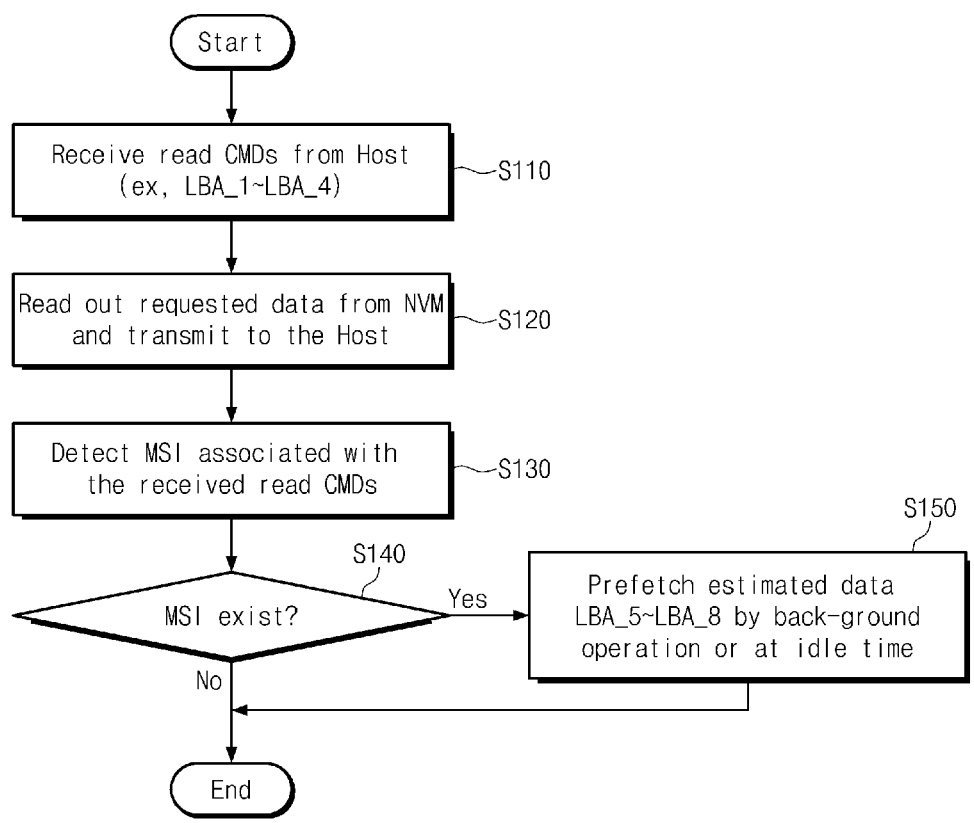
FIG. 10 is a flow chart schematically illustrating a prefetch method according to at least some example embodiments of the inventive concepts.

FIG. 10 is a flow chart schematically illustrating a prefetch method according to at least some example embodiments of the inventive concepts. Referring to FIG. 10, a storage device 200 predicts data to be prefetched based on a logical address LBA and a multi-stream index MSI of a read command provided from a host 100. The storage device 200 prefetches predicted data during a background operation or an idle time.

In step S110, the storage device 200 receives a read command rCMD provided from the host 100. At this time, a plurality of read command rCMDs may be provided by a unit of plural transactions. Each read command may include a logical address LBA, a sector count nSC, and a multi-stream index MSI. According to at least some example embodiments of the inventive concepts, four read commands are provided. However, the inventive concept is not limited thereto. It is understood that the storage device 200 performs prediction and prefetch operations with respect to at least one read command including a multi-stream index MSI.

In step S120, the storage device 200 reads memory areas of flash memory devices 230 to 250 corresponding to logical addresses LBA_1 to LBA_4. Here, it is assumed that read commands rCMDs are first read requests on stream data corresponding to a multi-stream index MSI. Read stream data may be stored in a read buffer area of a buffer memory 220. That is, a read operation on data read-requested by the host 100 is first performed. The storage device 200 sends stream data corresponding to the logical addresses LBA_1 to LBA_4 to the host 100.

In step S130, the storage device 200 detects a multi-stream index MSI included in the read command rCMD received in step S110.

In step S140, an operation is diverged according to whether a multi-stream index MSI is included in the read command rCMD received in step S110. As a consequence of determining that a multi-stream index MSI is included in the read command rCMD received in step S110, the method proceeds to operation S150 for a prefetch operation. On the other hand, as a consequence of determining that a multi-stream index MSI is not included in the read command rCMD received in step S110, the method is ended, for example until a next command is received. In the event that a multi-stream index MSI is not included in the read command rCMD received in step S110, the storage device 200 determines read-requested data as random data.

In step S150, the storage device 200 performs a prefetch operation. the storage device 200 previously reads data corresponding to a multi-stream index MSI=2 and stored in logical addresses LBA_5 to LBA_8 to be read-requested by the host 100, based on previously transferred read commands rCMDs. The storage device 200 stores the read data in a reserved prefetch resource unit 226 of the buffer memory 220. A prefetch operation on read-predicted data may be performed during an idle time of the storage device 200.

Thus, according to at least some example embodiments, a prefetch operation of the storage device 200 may be performed based on a multi-stream index MSI. Accordingly, it is possible to quickly respond to a read request on stream data through the prefetch operation.

Figure 11:
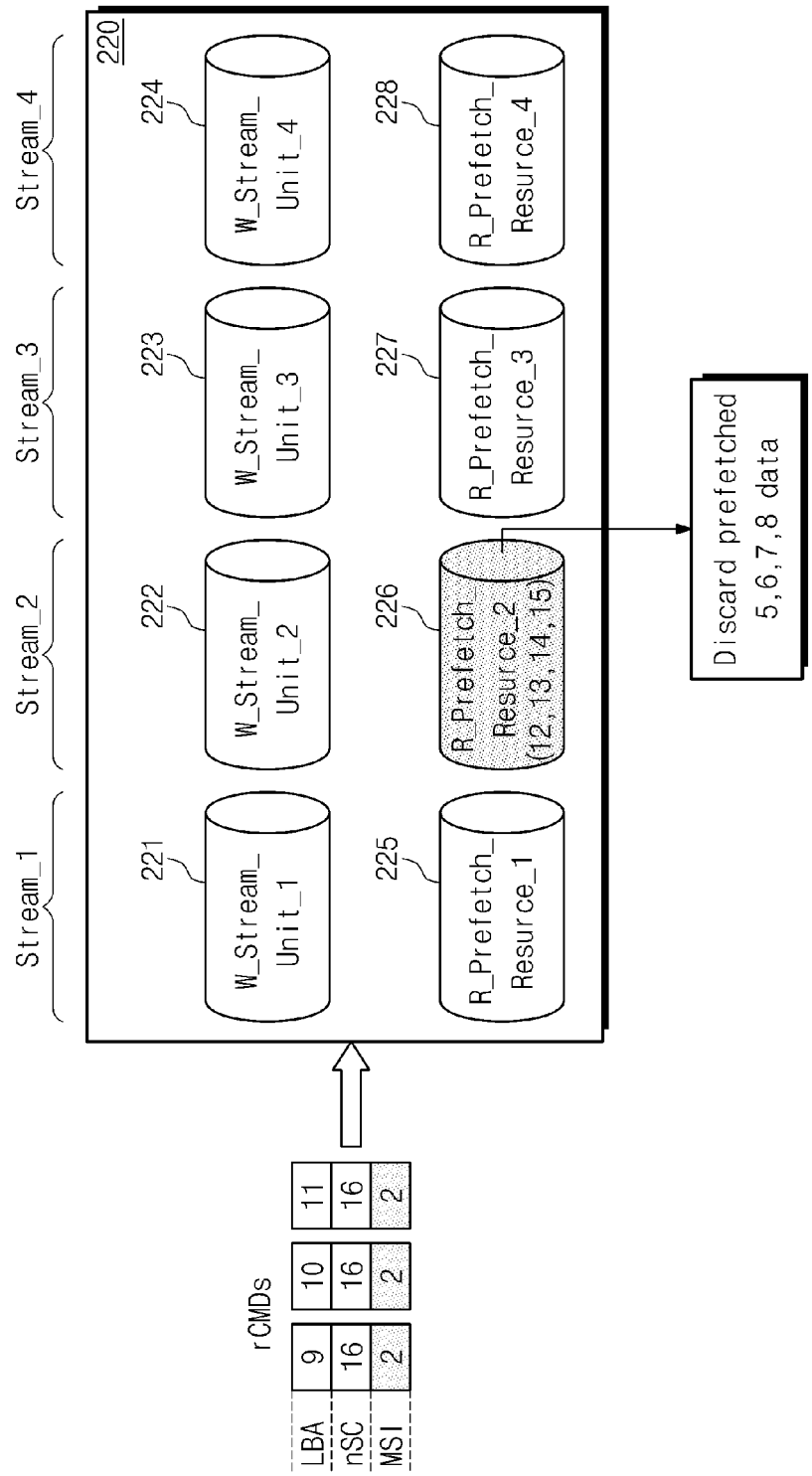
FIG. 11 is a diagram a prefetch method according to another embodiment of at least some example embodiments of the inventive concepts.

FIG. 11 is a diagram a prefetch method according to another embodiment of at least some example embodiments of the inventive concepts. Referring to FIG. 11, there is illustrated such a case that stream data prefetched by prediction is different from data requested by a host 100.

First, it is assumed that data of logical addresses LBA_5 to LBA_8 corresponding to a multi-stream index MSI=2 is prefetched in a prefetch resource unit 226 included in a read buffer area of a buffer memory 220. However, read commands rCMDs corresponding to logical addresses LBA_9 to LBA_11 of the multi-stream index MSI=2 are provided from a host 100. In this case, since prefetched data is different from read-requested data, it is discarded or invalidated.

First, a storage controller 210 of a storage device 200 reads stream data corresponding to the logical addresses LBA_9 to LBA_11 of the multi-stream index MSI=2 from flash memory devices 230 to 250. The read data is instantly sent to the host 100. Then, the storage controller 210 discards stream data of the logical addresses LBA_5 to LBA_8 prefetched in the prefetch resource unit 226. Here, the host 100 provides the storage controller 210 with a separate command for discarding stream data of the logical addresses LBA_5 to LBA_8.

In addition, the storage controller 210 performs prediction for a prefetch operation. That is, the storage controller 210 reads stream data of logical addresses LBA_11 to LBA_14 following the logical addresses LBA_9 to LBA_11 currently read-requested and stores the read data in the prefetch resource unit 226.

Figure 12:
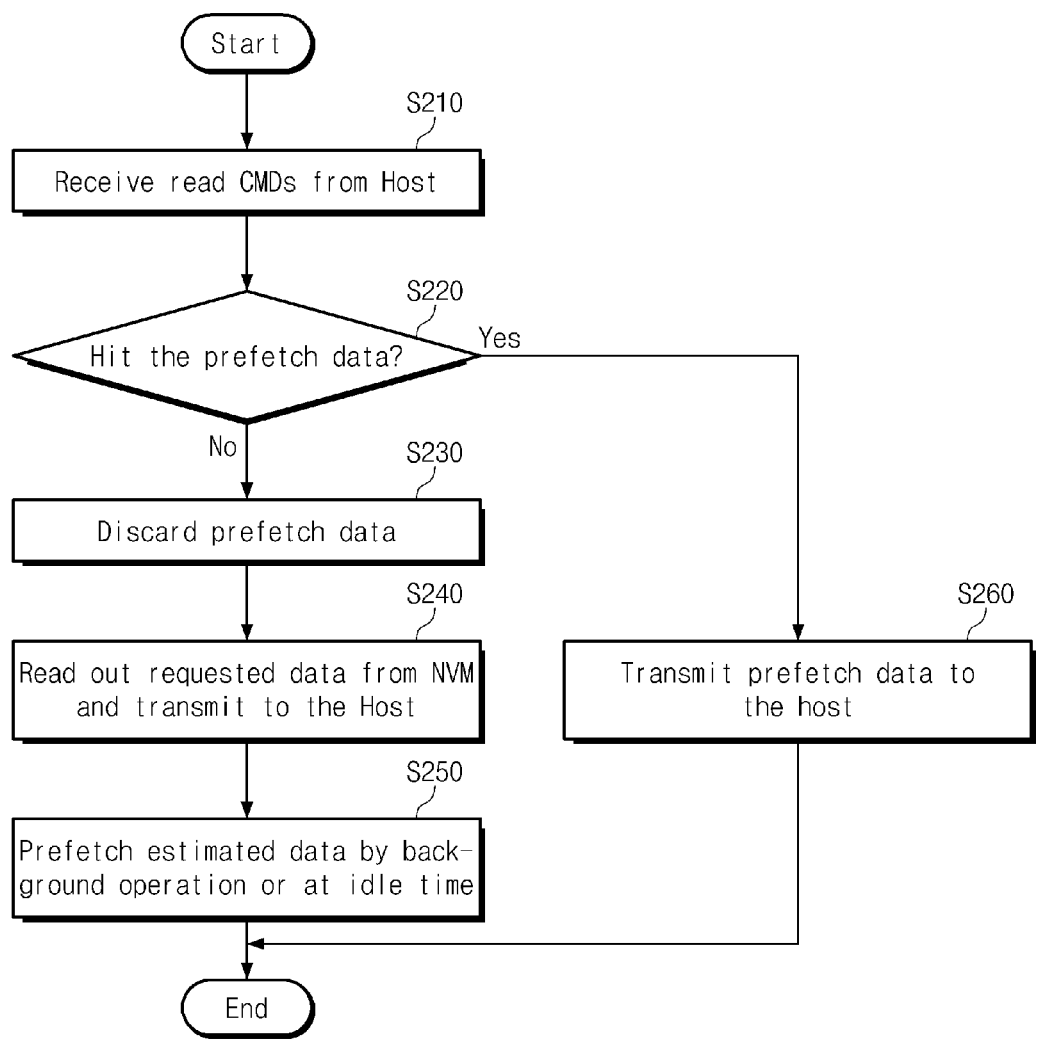
FIG. 12 is a flow chart schematically illustrating a prefetch method according to another embodiment of at least some example embodiments of the inventive concepts.

FIG. 12 is a flow chart schematically illustrating a prefetch method according to another embodiment of at least some example embodiments of the inventive concepts. Referring to FIG. 12, a storage device 200 manages data prefetched in prefetch resource units 225 to 228 based on whether data read-requested by a host 100 is equal to prefetched data.

In step S210, the storage device 200 receives read commands rCMDs from the host 100. Each of the read commands rCMDs may correspond to a transaction unit and includes a logical address LBA, a sector count nSC, and a multi-stream index MSI.

In step S220, the storage device 200 compares a logical address of data read-requested in step S210 with a logical address of prefetched stream data. The logical address of prefetched stream data is predicted by a storage controller 210. If read-requested data is equal to prefetched data (Yes), the method proceeds to step S260. If read-requested data is different from prefetched data (No), the method proceeds to step S230.

In step S230, since an address of the prefetched data is different from that of the read-requested data, the storage controller 210 discards or invalidates data stored in the prefetch resource unit 226.

In step S240, the storage device 200 reads data read-requested in step S210 from flash memory devices 230 to 250. The storage device 200 temporarily stores the read data in a read buffer area of a buffer memory 220 and then sends it to the host 100. Here, it is understood that an order of steps S230 and S240 may be changed.

In step S250, the storage device 200 pre-fetches stream data based on multi-stream indexes MSI and addresses included in the read commands rCMDs received in step S210. That is, the storage device 200 predicts a logical address to be read-requested by the host 100 and prefetches stream data of the predicted area in a previously allocated prefetch resource unit 226.

In step S260, the storage device 200 sends the prefetched data stored in the prefetch resource unit 226 to the host 100.

The storage device 200 performs a prefetch operation based on the read commands received in step S210.

According to at least some example embodiments of the inventive concepts, the storage device 200 performs a prefetch operation based on a multi-stream index MSI. Consequently, the storage device 200 may responds quickly to a read request on multi-stream data through the prefetch operation.

Figure 13:
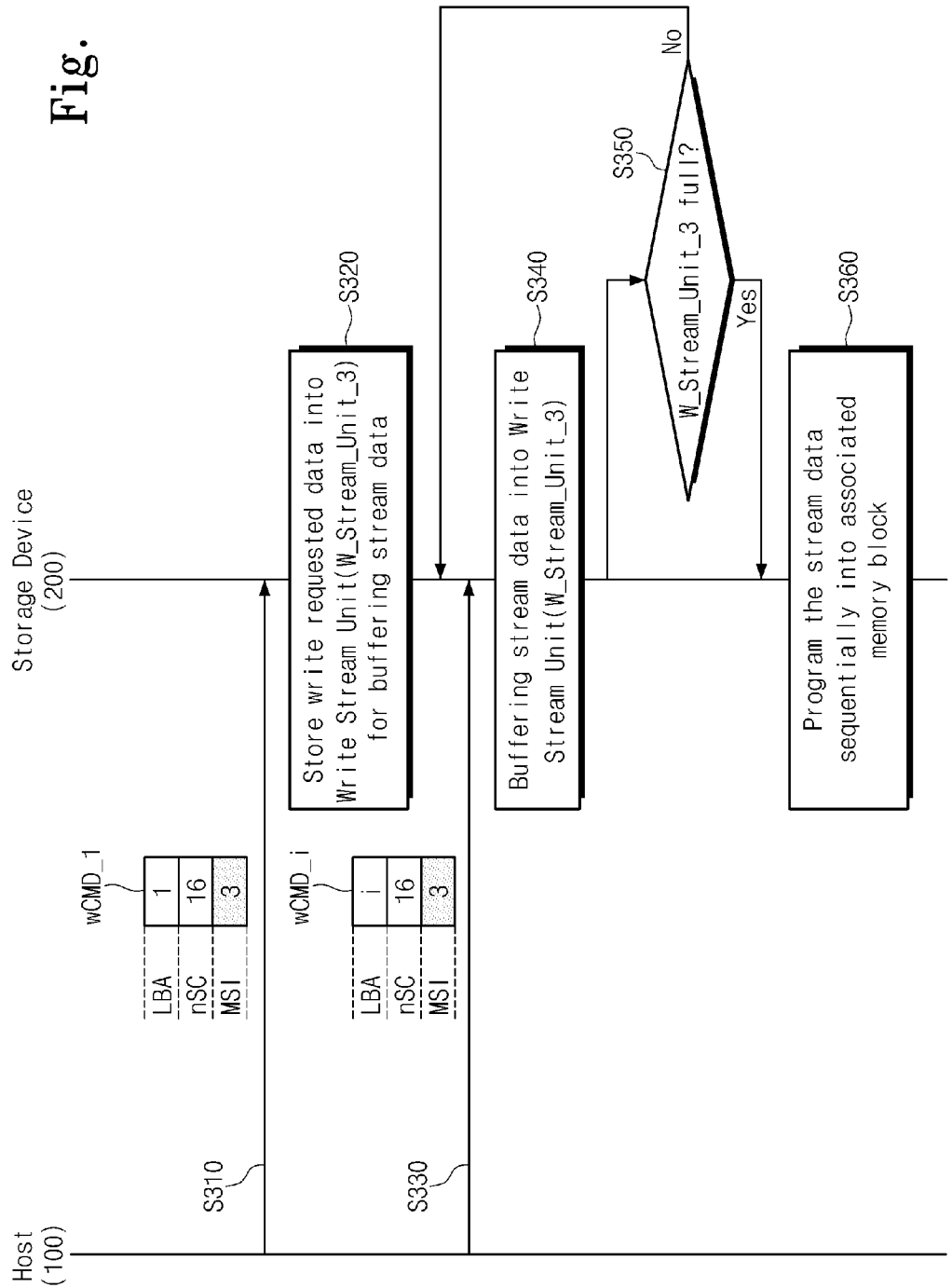
FIG. 13 is a diagram schematically illustrating a multi-stream data writing method according to at least some example embodiments of the inventive concepts.

FIG. 13 is a diagram schematically illustrating a multi-stream data writing method according to at least some example embodiments of the inventive concepts. Referring to FIG. 13, in a case where a write command on stream data is transferred, a host 100 inserts a multi-stream index MSI in the write command. Here, it is assumed that multi-stream configuration of a storage device 200 is completed through a predetermined or, alternatively, reference procedure. The write command is sent with respect to each of a plurality of segments obtained by dividing the stream data.

In step S310, the host 100 transfers a write command wCMD_1 to the storage device 200. The write command wCMD_1 includes a logical address LBA, a sector count nSC, and a multi-stream index MSI. The storage device 200 detects whether the write command wCMD_1 includes a multi-stream index MSI=3.

In step S320, the storage device 200 stores write-requested stream data in a write stream unit W_Stream_Unit_3 included in a write buffer area of a buffer memory 220.

In step S330, the storage device 200 receives write commands wCMD_i (i being an integer of 2 or more) sequentially provided from the host 100. At this time, the storage device 200 detects the write stream unit W_Stream_Unit_3 of the write-requested data.

In step S340, the storage device 200 stores write-requested stream data in the write stream unit W_Stream_Unit_3 included in a write buffer area of the buffer memory 220.

In step S350, the storage device 200 detects whether the write stream unit W_Stream_Unit_3 is filled by data. As a consequence of detecting that the write stream unit W_Stream_Unit_3 is filled by data, in step S360, stream data buffered by the write stream unit W_Stream_Unit_3 that is filled by data is programmed in an allocated memory block. As a consequence of detecting that the write stream unit W_Stream_Unit_3 is not filled by data, a write request is provided from the host 100 to buffer data using the write stream unit W_Stream_Unit_3.

Thus, in a stream data writing operation performed based on a multi-stream index MSI according to at least some example embodiments, stream data write-requested by the host 100 by a segment unit is accumulated on the storage device 200, and the accumulated data is sequentially programmed by a memory block unit. Thus, it is possible to improve program speeds of flash memory devices 230 to 250 on write-requested multi-stream data.

Figure 14:
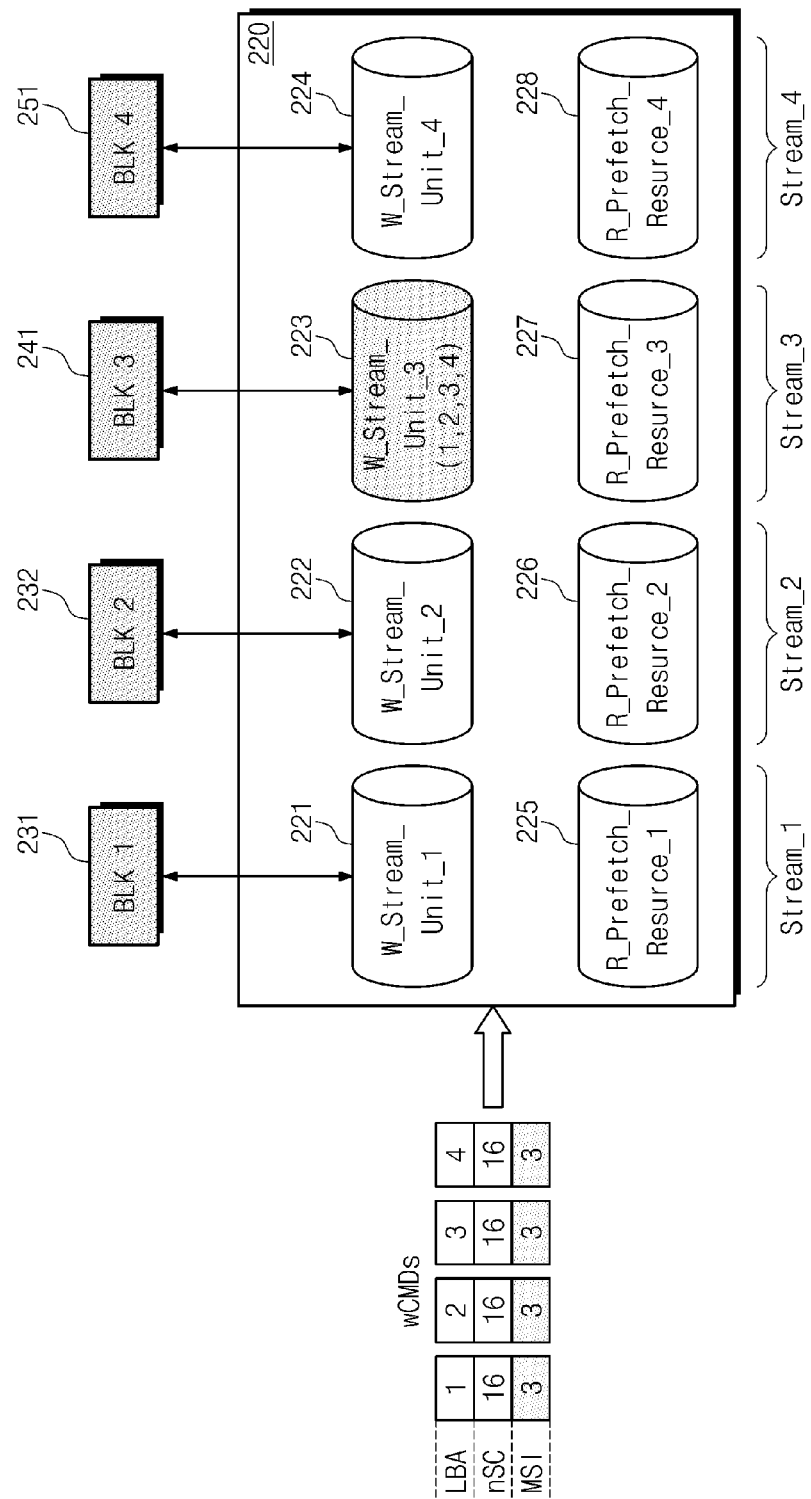
FIG. 14 is a diagram schematically illustrating a stream data writing method according to at least some example embodiments of the inventive concepts.

FIG. 14 is a diagram schematically illustrating a stream data writing method according to at least some example embodiments of the inventive concepts. Referring to FIG. 14, write-requested stream data is buffered by a write buffer area of a buffer memory 220 by a memory block unit.

If write commands wCMDs each including a multi-stream index MSI=3 is received, a storage controller 210 buffers write-requested data using an allocated write stream unit 223. In the event that a write command wCMD including a multi-stream index MSI=1 is received, the storage controller 210 buffers write-requested data using a write stream unit 221 allocated for the multi-stream index MSI=1.

In the event that the allocated write stream unit 223 is filled by write-requested data, the storage controller 210 flushes buffered data into a memory block 241. A size of the write stream unit 223 is set to be equal to a data capacity of an allocated memory block. Thus, a sequential data program operation on the memory block 241 is performed. It is possible to improve a write speed through a sequential data program operation on memory blocks of flash memory devices 230 to 250.

Figure 15:
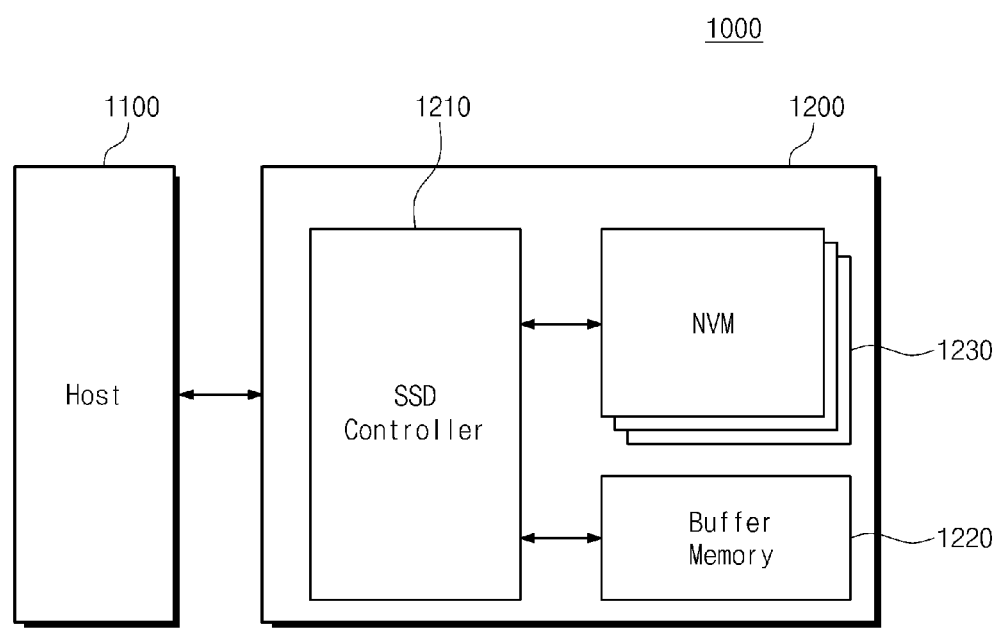
FIG. 15 is a block diagram illustrating a solid state drive system according to at least some example embodiments of the inventive concepts.

FIG. 15 is a block diagram illustrating a solid state drive system according to at least some example embodiments of the inventive concepts. Referring to FIG. 15, a solid state drive (SSD) system 1000 includes a host 1100 and SSD 1200. The SSD 1200 includes an SSD controller 1210, a buffer memory 1220, and a nonvolatile memory device 1230. According to at least some example embodiments of the inventive concepts, the host 1100 and SSD 1200 may have the same structure and operation as that described above with respect to the host 100 and storage device 200.

A plurality of application programs, an operating system, etc. may be driven on the host 1100. Programs driven on the host 1100 generate write requests or read requests on multi-stream data. In this case, the host 1100 provides a command including a multi-stream index MSI when an access on multi-stream data is requested.

The SSD controller 1210 provides physical interconnection between the host 1100 and the SSD 1200. The SSD controller 1210 provides an interface with the SSD 1200 corresponding to a bus format of the host 1100. The bus format of the host 1100 may include USB (Universal Serial Bus), SCSI (Small Computer System Interface), PCI express, ATA, PATA (Parallel ATA), SATA (Serial ATA), SAS (Serial Attached SCSI), NVMe, and the like.

The SSD controller 1210 controls the buffer memory 1220 and the nonvolatile memory device 1230 based on a multi-stream index MSI included in a command from the host 1100.

The buffer memory 1220 temporarily stores write data provided from the host 1100 or data read out from the nonvolatile memory device 1230. In the event that data existing in the nonvolatile memory device 1230 is cached, at a read request of the host 1100, the buffer memory 1220 may support a cache function to provide cached data directly to the host 1100. The buffer memory 1220 is implemented by a synchronous DRAM to provide sufficient buffering to the SSD 1200 used as an auxiliary mass storage device. However, at least some example embodiments of the inventive concepts are not limited thereto.

The nonvolatile memory device 1230 may be provided as storage medium of the SSD 1200. For example, the nonvolatile memory device 1230 may be a NAND flash memory device having a mass storage capacity. The nonvolatile memory device 1230 may be formed of a plurality of memory devices. In this case, memory devices may be connected with the SSD controller 1210 by the channel.

According to at least some example embodiments of the inventive concepts, the nonvolatile memory device 1230 is formed of a NAND flash memory. However, the nonvolatile memory device 1230 is not limited to a NAND flash memory device. For example, a storage medium of the SSD 1200 may be formed of a PRAM, an MRAM, a ReRAM, a FRAM, a NOR flash memory, and the like. Further, the inventive concept may be applied to a memory system which uses different types of memory devices together. A volatile memory device (e.g., DRAM) may be used as the storage medium.

Figure 16:
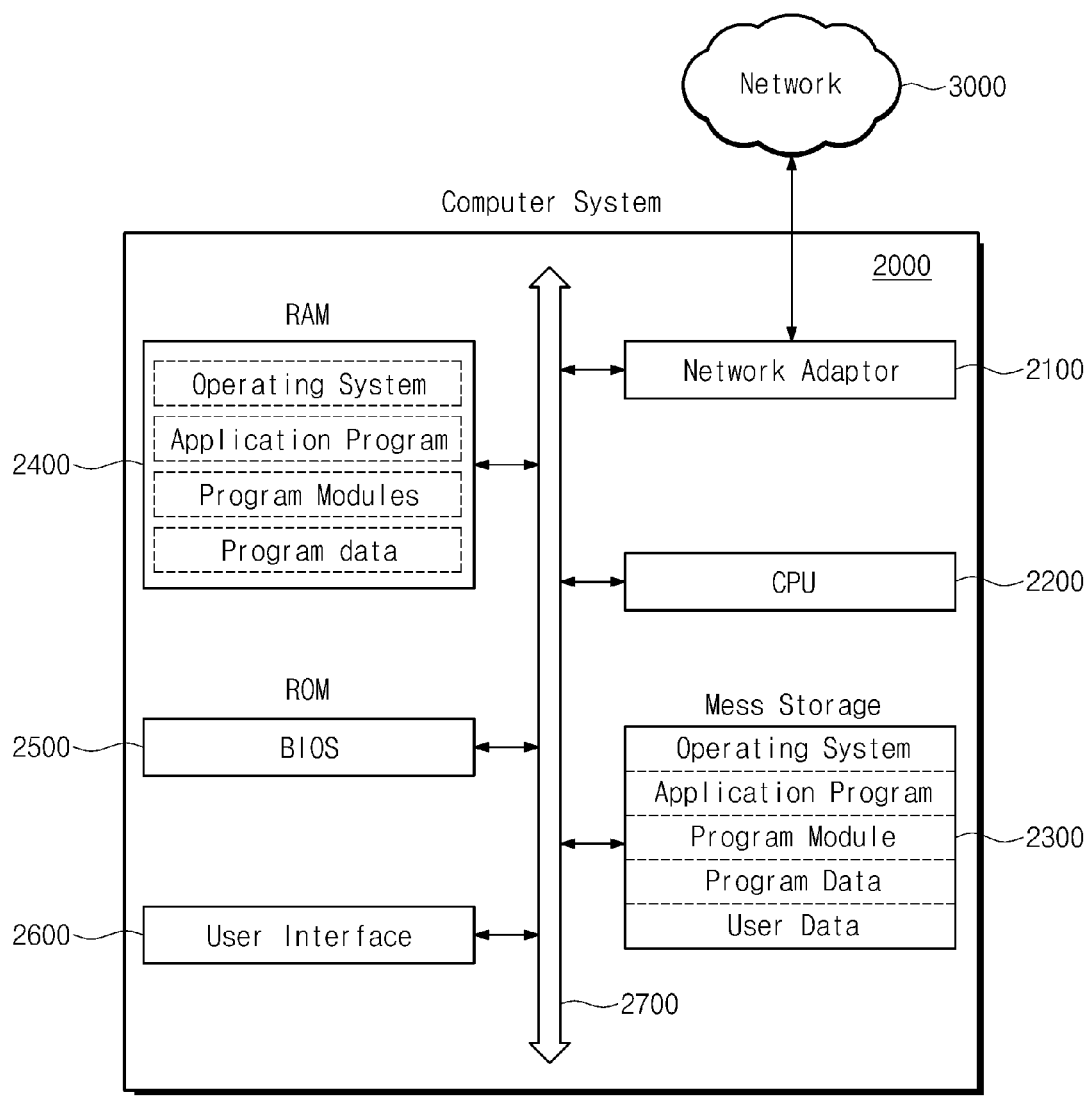
FIG. 16 is a block diagram schematically illustrating a computing system according to at least some example embodiments of the inventive concepts.

FIG. 16 is a block diagram schematically illustrating a computing system according to at least some example embodiments of the inventive concepts. Referring to FIG. 16, a computing system 2000 comprises a network adaptor 2100, a central processing unit (CPU) 2200, a mass storage device 2300, a RAM 2400, a ROM 2500, and a user interface 2600 which are connected with a system bus 2700.

The network adaptor 2100 provides an interface between the computing system 2000 and external networks 3000. The CPU 2200 controls an overall operation for driving an operating system and an application program which are resident on the RAM 2400. The data storage device 2300 stores data needed for the computing system 2000. For example, the data storage device 2300 stores an operating system for driving the computing system 2000, an application program, various program modules, program data, user data, and so on.

The RAM 2400 is used as a working memory of the computing system 2000. Upon booting, the operating system, the application program, the various program modules, and program data needed to drive programs and various program modules read out from the data storage device 2300 may be loaded onto the RAM 2400. The ROM 2500 stores a basic input/output system (BIOS) which is activated before the operating system is driven upon booting. Information exchange between the computing system 2000 and a user may be made via the user interface 2600. In addition, the computing system 2000 may further include a battery, a modem, and the like. Although not shown, the computing system 2000 may further include an application chipset, a camera image processor (CIS), a mobile DRAM, and the like.

The mass storage device 2300 may be implemented by a solid state drive, a multimedia card (MMC), a secure digital (SD) card, a micro SD card, a memory stick, an ID card, a PCMCIA card, a chip card, an USB card, a smart card, a compact flash (CF) card, and so on. According to at least some example embodiments of the inventive concepts, the mass storage device 2300 may have the same structure and operation as that described above with respect to the storage device 200.

A memory card, a nonvolatile memory device and/or a memory controller according to at least some example embodiments of the inventive concepts may be packed by one selected from various types of packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

Example embodiments having thus been described, it will be obvious that the same may be varied in many ways. Such variations are not to be regarded as a departure from the intended spirit and scope of example embodiments of at least some example embodiments of the inventive concepts, and all such modifications as would be obvious to one skilled in the art are intended to be included within the scope of the following claims.

What is claimed is:

1. A data storage device configured to exchange multi-stream data with a host, the data storage device comprising:
a nonvolatile memory device;

a buffer memory configured to temporarily store data to be stored in the nonvolatile memory device or data read from the nonvolatile memory device; and a storage controller configured to receive from the host an access command for accessing segments of the multi-stream data, the accessing including reading the segments of the multi-stream data from or writing the segments of the multi-stream data to the nonvolatile memory device, wherein the storage controller is configured to determine whether access-requested segments are sequential stream data or non-stream data based on whether a first multi-stream index is included in the access command and the storage controller is configured to store the access-requested segments in the buffer memory based on the determination, the access-requested segments being the segments of the multi-stream data for which access is requested in the access command, the multi-stream data including a plurality of data streams that correspond respectively to a plurality of multi-stream indexes, the first multi-stream index being one of a plurality of multi-stream indexes, each multi-stream index identifying a respective data stream.

2. The data storage device of claim 1, wherein the storage controller is configured to configure a read buffer area and a write buffer area of the buffer memory for buffering of each of the plurality of data streams of the multi-stream data according to a request of the host.

3. The data storage device of claim 2, wherein the storage controller is configured to divide the write buffer area into a plurality of write stream units and each of the plurality of write stream units is configured to buffer write-requested segments having the same multi-stream index from among the plurality of multi-stream indexes, the write-requested segments being segments identified in a write command received by the data storage device.

4. The data storage device of claim 3, wherein the storage controller is configured such that a size of each of the plurality of write stream units corresponds to a memory block size of the nonvolatile memory device.

5. The data storage device of claim 3, wherein the data storage device is configured such that when a write stream unit, from among the plurality of write stream units, is filled with data to provide a filled write stream unit, the data of the filled write stream unit is sequentially programmed in an allocated memory block of the nonvolatile memory device.

6. The data storage device of claim 2, wherein the access command is a first read command, and the storage controller is configured to predict data for which a second read command will be received in the future using the first multi-stream index and an address included in the first read command provided from the host.

7. The data storage device of claim 6, wherein the storage controller is configured to read the predicted data from the nonvolatile memory device, and configured to temporarily store the predicted data in the read buffer area.

8. The data storage device of claim 7, wherein the storage controller is configured to divide the read buffer area into a plurality of read resource units respectively corresponding to the plurality of multi-stream indexes and the predicted data is stored in a corresponding one of the read resource units.

9. The data storage device of claim 8, the data storage device is configured such that when data stored in the read resource units is equal to read-requested data, the storage controller sends data stored in the read resource units to the host, the read-requested data being data identified in a read command received by the data storage device.

10. The data storage device of claim 8, wherein the data storage device is configured such that when data stored in the read resource units is different from read-requested data, the storage controller discards data stored in the read resource units and accesses the nonvolatile memory device to read the read-requested data, the read-requested data being data identified in a read command received by the data storage device.

11. The data storage device of claim 1, wherein the storage controller supports at least one interface type from among USB (Universal Serial Bus), SCSI (Small Computer System Interface), PCI express, ATA, PATA (Parallel ATA), SATA (Serial ATA), SAS (Serial Attached SCSI), and NVMe.

12. The data storage device of claim 1, wherein,
the nonvolatile memory device is a flash memory device;
the storage controller is configured to receive an ID read request from the host and, in response to the ID read request, send ID information associated with a maximum number of data streams capable of being processed with respect to the access command of the host; and
the storage controller includes a flash interface configured to exchange data with the flash memory device through one or more memory channels.

13. A user device comprising:
a host configured to issue access requests for a plurality of data streams of multi-stream data through a plurality of threads and configured to provide different ones of a plurality of multi-stream indexes to the plurality of data streams when the access requests are issued, each multi-stream index identifying a respective stream; and
a solid state drive configured to
receive an access request for accessing segments of the multi-stream data, the accessing including reading the segments of the multi-stream data from or writing the segments of the multi-stream data to the solid state drive, and
determine whether access-requested segments are sequential stream data or non-stream data based on whether a multi-stream index, from among the plurality of multi-stream indexes, is included in the access request, the access-requested segments being the segments of the multi-stream data for which access is requested in the access request.

14. A data storage device configured to exchange multi-stream data including a plurality of data streams with a host, the data storage device comprising:
a non-volatile memory device;
a buffer memory; and
a storage controller configured to,
receive a data access command for performing a data access operation on the non-volatile memory device, the data access command identifying segments of data included in the data access operation,
determine whether each of the identified segments is sequential stream data or non-stream data based on whether the data access command identifies a corresponding one of a plurality of multi-stream indexes, the plurality of multi-stream indexes identifying, respectively, the plurality of data streams, and
store the identified segments in the buffer memory in accordance with the one or more of the plurality of multi-stream indexes based on the determination.

15. The data storage device of claim 14, wherein the buffer memory includes a write buffer area and a read buffer area.

16. The data storage device of claim 15 wherein,
the storage controller is configured to divide the write buffer area into a plurality of sections corresponding, respectively, to the plurality of multi-stream indexes, and
the storage controller is configured such that when the data access command is a write command, the storage controller stores each of the identified segments in the section of the write buffer area that corresponds to the multi-stream index of the identified segment.

17. The data storage device of claim 15, wherein the storage controller is configured to divide the read buffer area into a plurality of sections corresponding, respectively, to the plurality of multi-stream indexes, and
the storage controller is configured such that when the data access command is a read command, the storage controller stores each of the identified segments in the section of the read buffer area that corresponds to the multi-stream index of the identified segment.

18. The data storage device of claim 12, wherein the storage controller is configured to prefetch expected data from the flash memory device based on the first multi-stream index included in the access command.

19. The data storage device of claim 18, wherein the storage controller is configured to store expected data in a section of the buffer memory allocated by a stream unit.

\* \* \* \* \*